M. D. TINDAL.
AUTOMOBILE AXLE.
APPLICATION FILED OCT. 5, 1908.
942,151.
Patented Dec. 7, 1909.
2 SHEETS—SHEET 1.
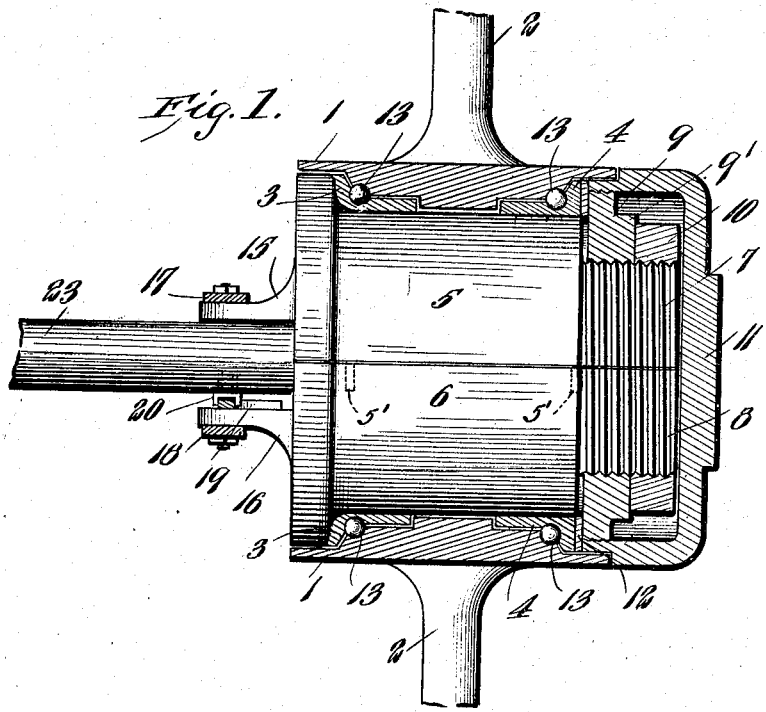
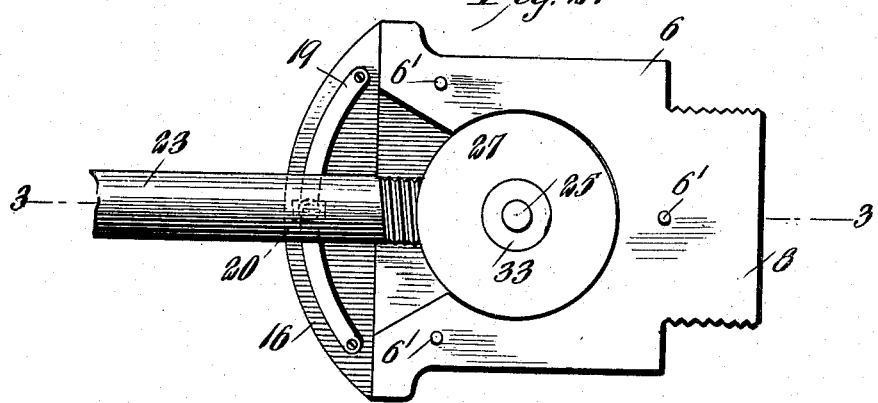
WITNESSES
INVENTOR
MACK DUFFIE TINDAL
BY
ATTORNEYS

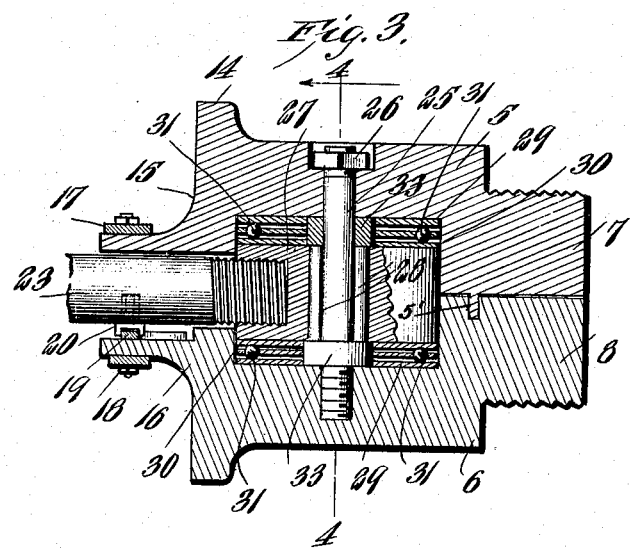
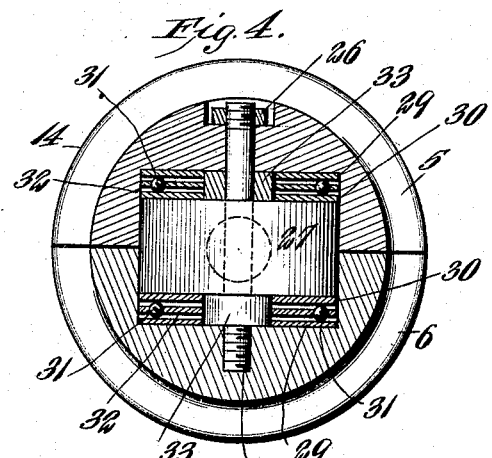
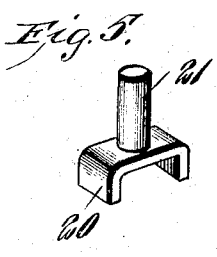
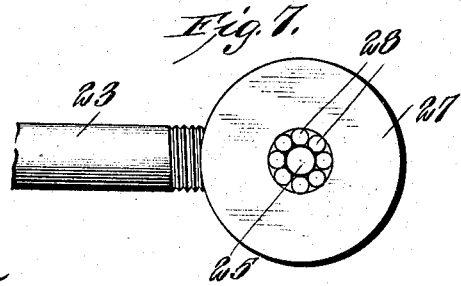

UNITED STATES PATENT OFFICE.

MACK DUFFIE TINDAL, OF COLUMBIA, SOUTH CAROLINA.

AUTOMOBILE-AXLE.

942,151. Specification of Letters Patent. Patented Dec. 7, 1909.

Application filed October 5, 1908. Serial No. 456,172.

*To all whom it may concern:*

Be it known that I, MACK DUFFIE TINDAL, a citizen of the United States, and a resident of Columbia, in the county of Richland and State of South Carolina, have made certain new and useful Improvements in Automobile-Axles, of which the following is a specification.

My invention relates to improvements in axles and more especially in those axles used in automobiles and similar motor vehicles, which permits the turning of the wheels on vertical axes in response to the movements of the steering mechanism.

An object of my invention is to provide a device in which the vertical turning axis may be located in the plane of the wheel itself instead of being outside of the plane as is common in the ordinary construction.

A further object of my invention is to provide guiding means for the hub member which works in conjunction with means on the axle itself, to guide the hub in its movement.

A further object of the invention is to provide a novel means for mounting the vertical axis of the wheel in order to reduce the friction to the minimum.

Other objects and advantages will appear in the following specification and will be particularly pointed out in the annexed claim.

My invention is illustrated in the accompanying drawings, in which similar reference characters indicate the same parts in the several views, and in which—

Figure 1 is a side view partly in section embodying my invention. Fig. 2 is a plan view of the lower half of the hub shown in Fig. 1. Fig. 3 is a vertical section along the line 3—3 of Fig. 2. Fig. 4 is a vertical section along the line 4—4 of Fig. 3. Figs. 5 and 6 are detail views of the guide parts, and Fig. 7 is a plan view showing the disposition of the roller bearings about the vertical axis.

Referring now to Fig. 1 I have shown therein a hub embodying my invention and comprising an annular ring 1, to which the spokes 2 are rigidly attached, and which is rotatably mounted on the bearing cones 3 and 4. These latter consist of annular rings loosely mounted on the exterior of the semi-cylindrical members 5 and 6, the former being provided with dowel pins 5′ arranged to enter openings 6′ in the latter. These members are provided with threaded reduced extensions 7 and 8 respectively, arranged to engage the threaded openings of the ring 9 and the nut 10 contained within the cap 11. The ring 9 is screw threaded on its exterior to engage with the threads on the cap 11, and is provided with an integral nut 9′ preferably of hexagonal shape so as to enable the ring to be forced up against a washer 12, thereby forcing the cones 3 and 4, together with the intervening hub ring 1, into close relation to the best adjustment of the balls 13 as clearly seen in Fig. 1.

The parts just described comprise a convenient means for mounting the wheel upon the hub and for adjusting the ball bearing action thereof.

Referring now to Figs. 2 and 3, it will be seen that the semi-cylindrical members 5 and 6 are provided on one end with a flange 14 and the upper and lower lateral extensions 15 and 16 respectively. Bolted to the upper and lower extensions are the steering rods 17 and 18 respectively. These are interchangeable. On the upper side of the extension 16 is secured an arc shaped guide member 19 arranged to enter between the arms of a yoke 20, which has a centrally disposed shank 21 adapted to enter a threaded bushing 22, carried on the under side of the main axle 23. The construction of this yoke and the bushing arrangement is clearly shown in Figs. 5 and 6. The bushing is provided with exterior threads arranged to engage the threads of a hole on the under side of the shaft so that the bushing remains stationary in the shaft while the pin or shank 21 of the yoke 20 turns freely therein. As the hub is turned on its vertical axis, the guide member 19 passes between the arms of the yoke which may turn on its pivot 21 to prevent the binding of the parts. The rim of one end of the bushing is provided with a small notch so that after it is screwed in with the fingers, it may be driven up tight by means of a tool, such as a chisel.

The vertical axis, which, as before stated, lies in the plane of the wheel, consists of the pivot shaft 25, which is screwed at one end into the lower semi-cylindrical member 6 and is threaded at its upper end to receive a nut 26, which may be screwed down to hold the two halves 5 and 6 together. This nut is countersunk, as shown in Fig. 3, to permit the cones 3 and 4 to be slipped into place as already described.

The members 5 and 6 are provided with cored out central portions to provide a knuckle joint mechanism. This consists of a circular head 27 screwed to the end of the axle 23, or formed integral therewith, and provided with a central opening therein arranged to receive the shaft 25. Between the shaft 25 and the head 27 I arrange a series of vertically disposed rollers 28, which constitute bearings for the head 27 in its movement around the shaft. In order to provide ball bearings for the upper and lower surfaces of the head 27, and also to protect the latter, I arrange the circular bearing plates 29 and 30, between which the balls 31 play. The latter are carried in the openings in a spacing plate 32. The two bearing plates, together with the spacing plate, are mounted exteriorly of a loose collar 33 at each end of the head 27, these collars serving also to retain the rollers 28 in position.

The arrangement just described, provides a convenient means for mounting the head 27 on the vertical axis 25 and also provides end bearings for the latter as already stated. The provision of the upper and lower bearing plates permits the use of a head and a hub of softer metal than would otherwise be possible if the ball bore directly upon these parts.

From the foregoing description of the various parts, the operation of the device may be readily understood. In the normal position of the device, as shown in Figs. 1 and 2, the course of the vehicle would be in a straight line. Now as the steering rods are operated, the hub is turned on the vertical axis, being guided by the guide member 19, which coöperates with the yoke 20 fastened to the axle 23. Thus the wheel may be turned in one direction or the other. The vertical roller bearings reduce the friction on the shaft 25, while the horizontal bearings reduce the friction on the top and bottom of the head as already explained.

It will be seen that I provide a device which has the advantage of having the vertical axis in the plane of the wheel itself. This permits of a construction in which only a slight movement of the steering rods will serve to turn the wheel to a considerable extent, thereby rendering the movement of the steering apparatus more effectual than it otherwise would be when the wheel is turned about a vertical axis outside of the hub.

I am aware that other forms of the device based upon the same general idea might be made, but I consider as my own and desire to claim, all such modifications as fairly fall within the spirit and scope of the invention.

I claim—

In a wheel and axle construction, a main horizontal shaft provided with a circular head, a hub, comprising two separable semi-cylindrical sections and provided with registering recesses arranged to receive said head, a vertical shaft constituting a retaining bolt for said separable members arranged to pass through an opening in said head, vertical rollers between said vertical shaft and said head, a collar disposed on said shaft at the upper and lower ends of said rollers, bearing plates and space plates arranged to fit over said collars and to be held in a recess in said hub together with a guide member arranged concentrically of said vertical shaft, and means on said horizontal shaft to coöperate with said guide member.

MACK DUFFIE TINDAL.

Witnesses:
V. G. HEISTT,
B. FISHBURNE.